United States Patent
Nakada et al.

(10) Patent No.: US 9,811,244 B2
(45) Date of Patent: Nov. 7, 2017

(54) DISPLAY CONTROL DEVICE, DISPLAY DEVICE, PRINTING APPARATUS, DISPLAY CONTROL METHOD AND NON-TRANSITORY COMPUTER READABLE MEDIUM STORING PROGRAM FOR DISPLAYING PROCESS OF DUPLEX PRINT PROCESSING

(75) Inventors: Hiroshi Nakada, Yokohama (JP);
Kanji Itaki, Yokohama (JP); Kimitake Hasuike, Yokohama (JP); Yasuhiro Hirano, Yokohama (JP)

(73) Assignee: FUJI XEROX CO., LTD., Minato-ku, Toyota (JP)

( * ) Notice: Subject to any disclaimer, the term of this patent is extended or adjusted under 35 U.S.C. 154(b) by 635 days.

(21) Appl. No.: 13/543,380

(22) Filed: Jul. 6, 2012

(65) Prior Publication Data

US 2013/0249940 A1    Sep. 26, 2013

(30) Foreign Application Priority Data

Mar. 23, 2012  (JP) ................. 2012-067835

(51) Int. Cl.
*G06F 3/0483* (2013.01)
*G06F 15/02* (2006.01)
(Continued)

(52) U.S. Cl.
CPC ........ *G06F 3/0483* (2013.01); *G06F 15/0291* (2013.01); *G06T 3/60* (2013.01);
(Continued)

(58) Field of Classification Search
CPC ............... G06F 3/0483; G06F 15/0291; G06F 17/30896; G06F 17/30882; G06F 3/0486;
(Continued)

(56) References Cited

U.S. PATENT DOCUMENTS 5,463,725 A * 10/1995 Henckel ................ G06F 3/0483
                                                              345/473
6,100,994 A *  8/2000 Schliekelmann et al. ... 358/1.15
(Continued)

FOREIGN PATENT DOCUMENTS

JP            511965 A      1/1993
JP         10222328 A      8/1998
(Continued)

OTHER PUBLICATIONS

Communication dated Dec. 15, 2015 from the Japanese Patent Office in counterpart application No. 2012-067835.

*Primary Examiner* — Michelle L Sams
(74) *Attorney, Agent, or Firm* — Sughrue Mion, PLLC

(57) ABSTRACT

A display control device includes: an obtaining unit that obtains a stacking image formed by stacking plural specific images for specifying respective contents of images recorded on at least one surface of each of plural recording media; and a controller that exerts control so that a process is displayed on a display screen, the process sequentially performing an operation to select one specific image from the plural specific images in the stacking image obtained by the obtaining unit and to change the one specific image to represent a state in which at least a part of a recording medium corresponding to the one specific image is turned, to thereby show at least a part of another specific image hidden behind the one specific image while changing one specific image to be selected.

8 Claims, 12 Drawing Sheets

(51) Int. Cl.
  *G06T 3/60* (2006.01)
  *G06T 11/20* (2006.01)
  *G09G 5/14* (2006.01)
  *G06F 3/0488* (2013.01)
  *G06F 3/0481* (2013.01)
  *G09G 5/377* (2006.01)

(52) U.S. Cl.
  CPC .............. *G06T 11/206* (2013.01); *G09G 5/14* (2013.01); *G06F 3/04812* (2013.01); *G06F 3/04886* (2013.01); *G06T 2219/2016* (2013.01); *G09G 5/377* (2013.01); *G09G 2340/12* (2013.01); *G09G 2380/14* (2013.01)

(58) Field of Classification Search
  CPC ..... G06F 3/04812; G06F 3/0482; G06T 3/60; G06T 2219/2016; G06T 3/04886; G06T 11/206; G06T 11/60; G09G 5/377; G09G 2340/12
  See application file for complete search history.

(56) References Cited

U.S. PATENT DOCUMENTS

| | | | | |
|---|---|---|---|---|
| 6,297,824 | B1* | 10/2001 | Hearst | G06F 17/30696 345/901 |
| 6,556,310 | B1* | 4/2003 | Livingston | 358/1.18 |
| 7,836,388 | B2* | 11/2010 | McCall | G06F 3/0485 715/200 |
| 8,934,119 | B2* | 1/2015 | McCuen et al. | 358/1.15 |
| 2002/0099456 | A1* | 7/2002 | McLean | 700/83 |
| 2005/0275879 | A1 | 12/2005 | Ogasawara | |
| 2006/0133664 | A1* | 6/2006 | Hong et al. | 382/154 |
| 2006/0181750 | A1* | 8/2006 | Lu | H04N 1/00403 358/527 |
| 2006/0184877 | A1* | 8/2006 | Ohashi | G06F 3/1211 715/234 |
| 2007/0061755 | A1* | 3/2007 | Taboada | G06F 3/0488 715/818 |
| 2008/0225346 | A1 | 9/2008 | Mano et al. | |
| 2010/0214598 | A1* | 8/2010 | Hoppenot et al. | 358/1.15 |
| 2011/0279363 | A1* | 11/2011 | Shoji et al. | 345/156 |
| 2012/0069393 | A1* | 3/2012 | Shoji | H04N 1/00448 358/1.15 |
| 2012/0084646 | A1* | 4/2012 | Homma | G06F 3/04883 715/273 |
| 2012/0162202 | A1* | 6/2012 | Rolleston | G06F 3/1208 345/419 |

FOREIGN PATENT DOCUMENTS

| | | |
|---|---|---|
| JP | 2004-102614 A | 4/2004 |
| JP | 2005161525 A | 6/2005 |
| JP | 2005-339250 A | 12/2005 |
| JP | 2008-207527 A | 9/2008 |
| JP | 2008-226050 A | 9/2008 |
| JP | 2008225808 A | 9/2008 |
| JP | 2010-028255 A | 2/2010 |
| JP | 2010-109844 A | 5/2010 |

* cited by examiner

DISPLAY CONTROL DEVICE, DISPLAY DEVICE, PRINTING APPARATUS, DISPLAY CONTROL METHOD AND NON-TRANSITORY COMPUTER READABLE MEDIUM STORING PROGRAM FOR DISPLAYING PROCESS OF DUPLEX PRINT PROCESSING

CROSS REFERENCE TO RELATED APPLICATIONS

This application is based on and claims priority under 35 USC §119 from Japanese Patent Application No. 2012-067835 filed Mar. 23, 2012.

BACKGROUND

Technical Field

The present invention relates to a display control device, a display device, a printing apparatus, a display control method and a non-transitory computer readable medium storing a program.

Related Art

Recently, many techniques have been proposed in which preview display is provided for various settings or states in print processing.

SUMMARY

According to an aspect of the present invention, there is provided a display control device including: an obtaining unit that obtains a stacking image formed by stacking plural specific images for specifying respective contents of images recorded on at least one surface of each of plural recording media; and a controller that exerts control so that a process is displayed on a display screen, the process sequentially performing an operation to select one specific image from the plural specific images in the stacking image obtained by the obtaining unit and to change the one specific image to represent a state in which at least a part of a recording medium corresponding to the one specific image is turned, to thereby show at least a part of another specific image hidden behind the one specific image while changing one specific image to be selected.

BRIEF DESCRIPTION OF THE DRAWINGS

An exemplary embodiment of the present invention will be described in detail based on the following figures, wherein.

DETAILED DESCRIPTION

Hereinafter, an exemplary embodiment according to the present invention will be described in detail with reference to the attached drawings.

Figure 1:
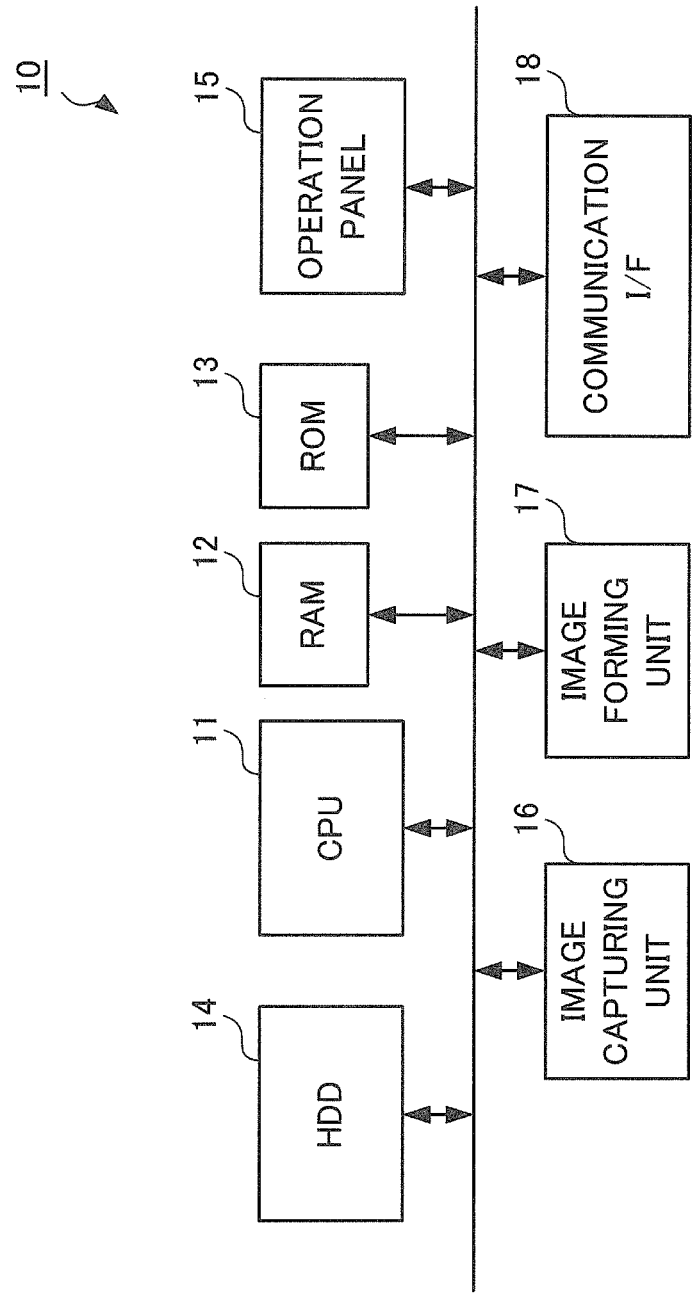
FIG. 1 is a diagram showing an example of a configuration of an image processing device to which the exemplary embodiment according to the present invention is applied.

FIG. 1 is a diagram showing an example of a hardware configuration of an image processing device 10 to which the exemplary embodiment is applied.

As shown in the figure, the image processing device 10 includes: a central processing unit (CPU) 11; a random access memory (RAM) 12; a read only memory (ROM) 13; a hard disk drive (HDD) 14; an operation panel 15; an image capturing unit 16; an image forming unit 17; and a communication interface (hereinafter, referred to as "communication I/F") 18.

The CPU 11 loads various programs stored in the ROM 13 and the like into the RAM 12, and then executes the programs, thereby to implement functions to be described later.

The RAM 12 is a memory that is used as a working memory or the like for the CPU 11.

The ROM 13 is a memory that stores, therein, the various programs executed by the CPU 11.

The HDD 14 is, for example, a magnetic disk device that stores, therein, image data captured by the image capturing unit 16, image data used for image formation in the image forming unit 17, and the like.

The operation panel 15 is, for example, a touch panel that displays various kinds of information and accepts an operation input by a user. In the exemplary embodiment, the operation panel 15 is provided as an example of a display screen, a display unit, an image display unit or a process display unit.

The image capturing unit 16 captures an image recorded on a recording medium such as paper. The image capturing unit 16 herein is, for example, a scanner. The scanner to be used may employ one of the following two systems: a CCD system in which reflected light of light emitted from a light source and directed at an original is reduced by a lens and is then received by charge coupled devices (CCD); and a CIS system in which reflected light of light beams sequentially emitted from LED light sources and directed at an original is received by a contact image sensor (CIS).

The image forming unit 17 forms an image on a recording medium. The image forming unit 17 herein is, for example, a printer. The printer to be used may employ one of the following two systems: an electrophotographic system in which an image is formed by transferring toner attached to a photoconductive drum onto a recording medium; and an ink jet system in which an image is formed by ejecting ink onto a recording medium. In the exemplary embodiment, the image forming unit 17 is provided as an example of a printing unit.

The communication I/F 18 transmits and accepts various kinds of information to and from other devices through a network.

In such an image processing device 10, there are some cases where processing such as duplex print, aggregate print, saddle-stitch bookbinding and combination thereof is designated when instructions for printing of electronic documents are provided from the operation panel 15. Here, "aggregate print" refers to printing of an aggregate of images of plural pages of the electronic document onto one sheet, and in the present specification, aggregate print in which an aggregate of images of N pages of the electronic document is printed on one sheet is especially referred to as "N-page aggregate print".

In the case where the electronic document is printed while designating various kinds of processing in this manner, it is conceivable to display a preview image that indicates a resulting finished state on the operation panel 15. In particular, in the case where the duplex print is designated, a bundle of sheets on which duplex print is performed is displayed, and in the case where the saddle-stitch bookbinding is designated, a saddle-stitched booklet is displayed on the operation panel 15 as a preview image of a finished article. Moreover, in such a preview image of a finished article, it is conceivable to indicate a state of forwarding pages for showing a state of the finished article in more detail.

However, if an operation such as pressing a page button is required to see the state of forwarding pages, it is difficult to make a check straightforwardly.

Accordingly, in the exemplary embodiment, in displaying the preview image of the finished article on the operation panel 15, processes of forwarding pages of the finished article are displayed by animation.

However, a display method of the processes of forwarding pages is different depending on the designated processing.

For example, in the case where the duplex print is designated in printing an electronic document, animation display is performed in which a thumbnail image of a page of the electronic document (hereinafter, referred to as "document image") is attached to a thumbnail image of a page of a sheet (hereinafter, referred to as "sheet image"), and with this state, a sheet image is turned from a front side to a backside.

Further, in the case where the saddle-stitch bookbinding is designated in printing an electronic document, animation display is performed in which pages of a saddle-stitched booklet are turned without requiring an operation of page turning.

On the other hand, in displaying the processes of turning pages by animation, if a state of turning all pages is displayed in the case where the number of pages of the finished article is large, there occurs a problem that the more processing time is required, and thereby efficiency is contrarily deteriorated.

Therefore, in the exemplary embodiment, in the case where the number of pages of the finished article is large, an intermediate portion sandwiched between an initial portion and a last portion is omitted or made to have a shorter display time. It should be noted that the user may determine whether to carry out such display control on the intermediate portion.

First, a description will be given to examples of display of the thumbnail images in the exemplary embodiment. It should be noted that, in the following display examples, the number of pages to be printed of the electronic document is seven, and all of them are placed in a portrait orientation.

FIGS. 2A to 2G are diagrams showing the display examples of thumbnail images in the case where duplex print (long side binding) is designated.

Figure 2A:
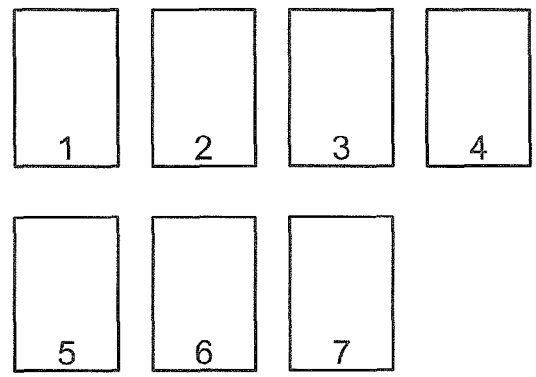
FIGS. 2A to 2G are diagrams showing examples of display of thumbnail images in the case where duplex print (long side binding) is designated.

In an initial state, as shown in FIG. 2A, there are seven document images. It should be noted that the number assigned to each document image indicates the page number of the electronic document, but does not mean that such number is included in each document image.

Figure 2B:
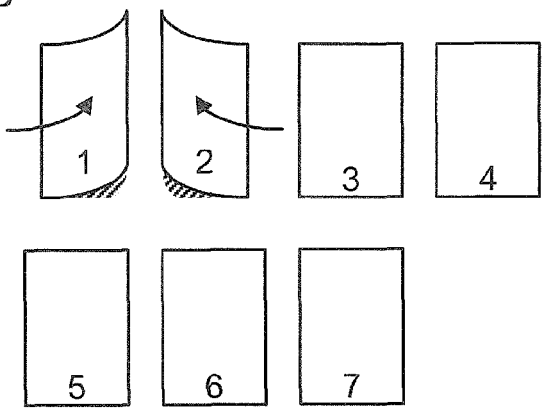

Here, when instructions of duplex print are accepted, it is determined that there is no instruction of aggregate print, and these document images are switched into the same number of sheet images each of which contains one document image. However, in the figure, the document images and the sheet images are shown without distinction. Then, as shown in FIG. 2B, of the seven sheet images, the backside of the first sheet image and the backside of the second sheet image approach and attract each other.

Figure 2C:
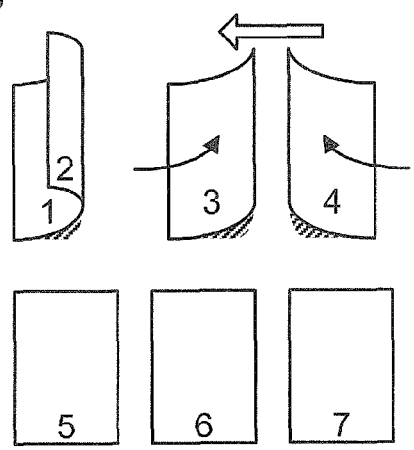

Consequently, as shown in FIG. 2C, the first sheet image and the second sheet image form one sheet image having document images on both sides thereof. The third sheet image and the fourth sheet image have the same behavior as the first sheet image and the second sheet image in FIG. 2B while moving over to the left as indicated by the hollow arrow.

Figure 2D:
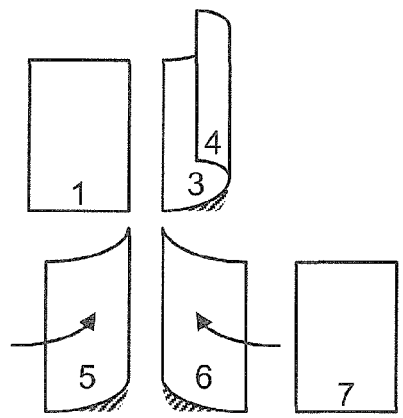

Thereafter, as shown in FIG. 2D, the sheet image formed by adding the first sheet image and the second sheet image is returned to a flat state, and from then on, two of the sheet images approach and repeat the same behavior throughout.

Figure 2E:
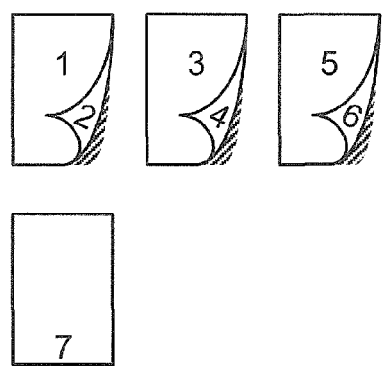

Accordingly, as shown in FIG. 2E, the seven sheet images are organized into four sheet images and properly aligned.

Figure 2F:
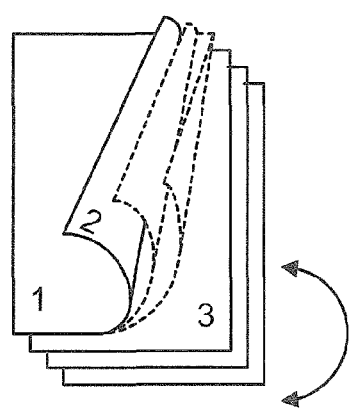
Figure 2G:
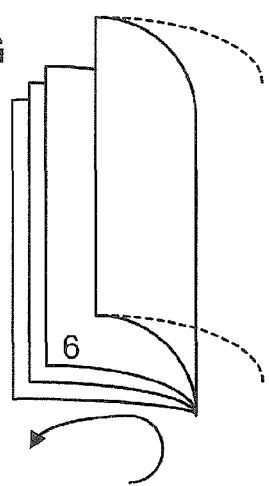

Ultimately, an image is displayed in which the four sheet images are bundled as shown in FIG. 2F. Moreover, at this time, pages are turned from the state as shown in FIG. 2F and finally the entire pages make one rotation as shown in FIG. 2G. In other words, the image is returned to the state where the first page is displayed on a foreground plane. From then on, animation display of such page turning and rotation is repeated.

FIGS. 3A to 3F are diagrams showing the display examples of thumbnail images in the case where 2-page aggregate print and duplex print (long side binding) are designated.

Figure 3A:
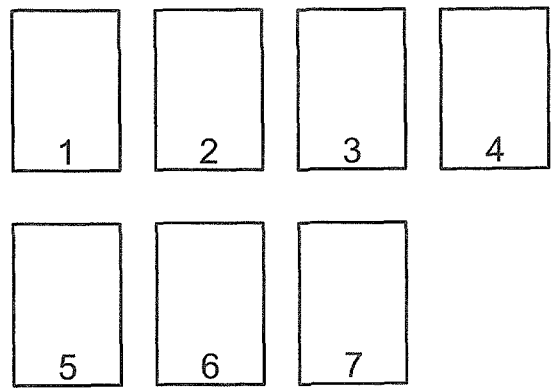
FIGS. 3A to 3F are diagrams showing examples of display of thumbnail images in the case where 2-page aggregate print and duplex print (long side binding) are designated.

In an initial state, as shown in FIG. 3A, there are seven document images. It should be noted that the number assigned to each document image indicates the page number of the electronic document, but does not mean that such number is included in each document image.

Figure 3B:
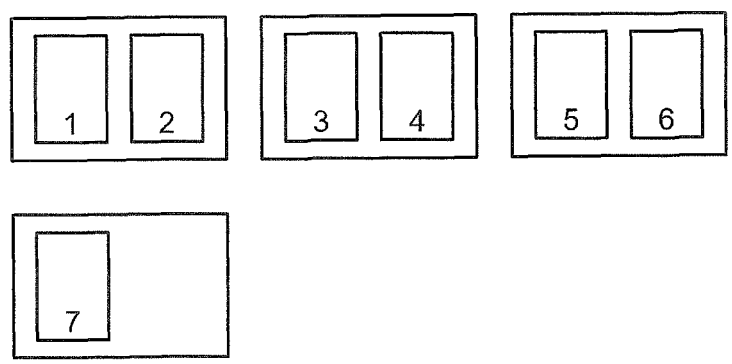

Here, when instructions of the 2-page aggregate print and the duplex print are accepted, the seven documents are reduced and aligned two by two with spacing, and as shown in FIG. 3B, a sheet image appears outside of each pair of aligned document images, to thereby represent that document images of two pages are contained in one sheet.

Figure 3C:
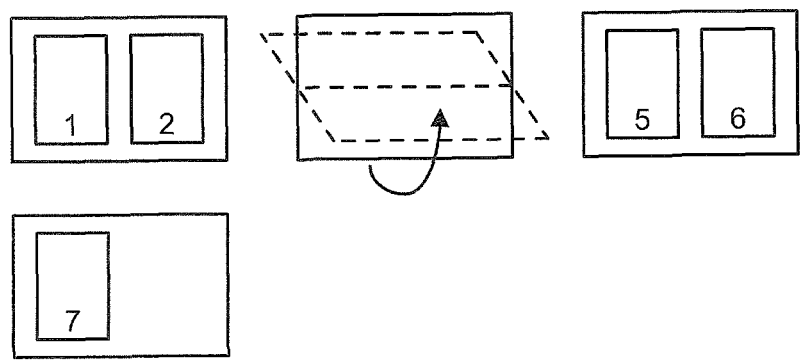

Thereafter, as shown in FIG. 3C, the second sheet image is rotated in the vertical direction and reversed.

Figure 3D:
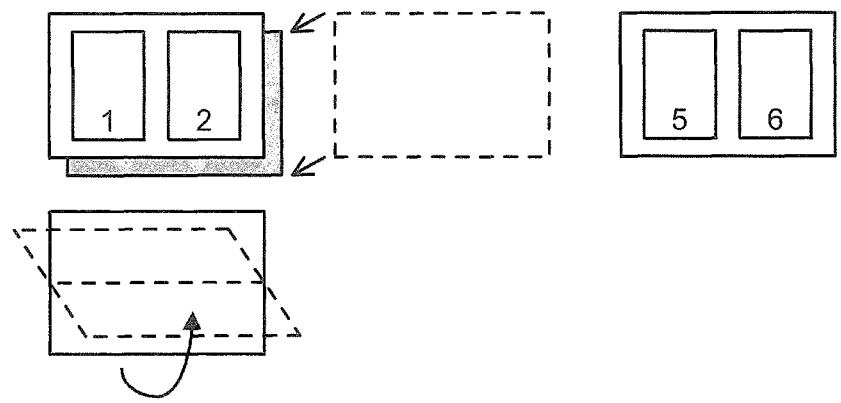

Then, as shown in FIG. 3D, the second sheet image slides into the backside of the first sheet image, and the fourth sheet image is rotated in the vertical direction and reversed.

Figure 3E:
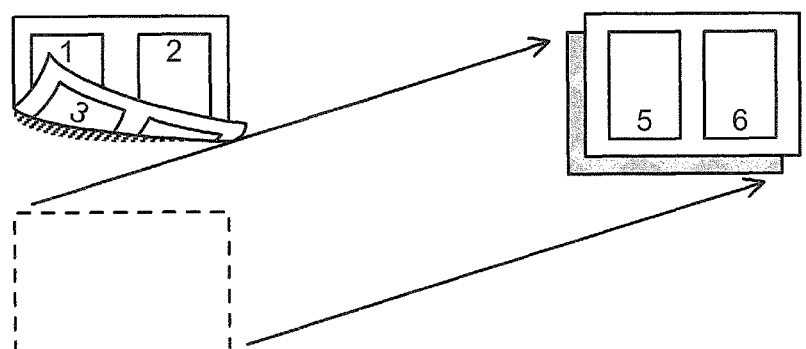

Thereafter, as shown in FIG. 3E, the first sheet image and the second sheet image form one sheet image having document images on both sides thereof. The fourth sheet image also has the same behavior as the second sheet image in FIG. 3D.

Figure 3F:
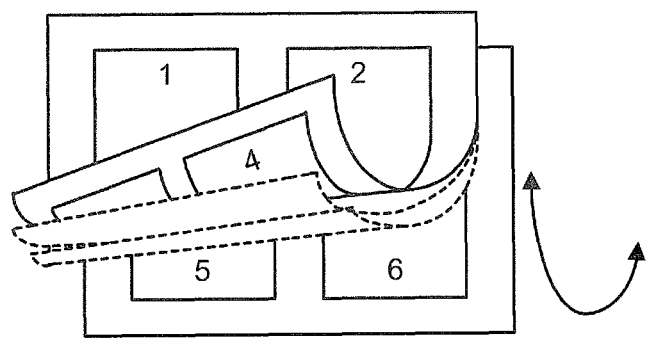

Ultimately, as shown in FIG. 3F, an image is displayed in which four sheet images are bundled. Moreover, at this time, pages are turned and finally the entire pages make one rotation. In other words, the image is returned to the state where the first page is displayed on a foreground plane. From then on, animation display of such page turning and rotation is repeated.

FIGS. 4A to 4H are diagrams showing display examples of thumbnail images in the case where saddle-stitch bookbinding is designated.

Figure 4A:
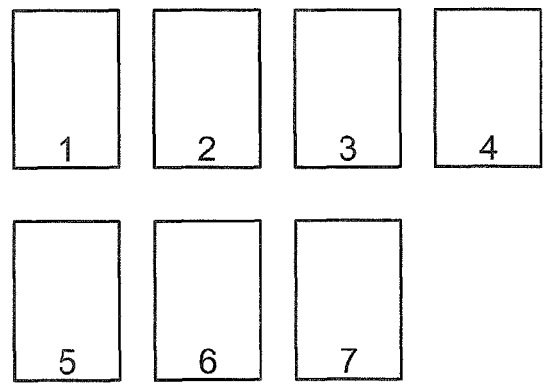
FIGS. 4A to 4H are diagrams showing examples of display of thumbnail images in the case where saddle-stitch bookbinding is designated.

In an initial state, as shown in FIG. 4A, there are seven document images. It should be noted that the number assigned to each document image indicates the page number of the electronic document, but does not mean that such number is included in each document image.

Figure 4B:
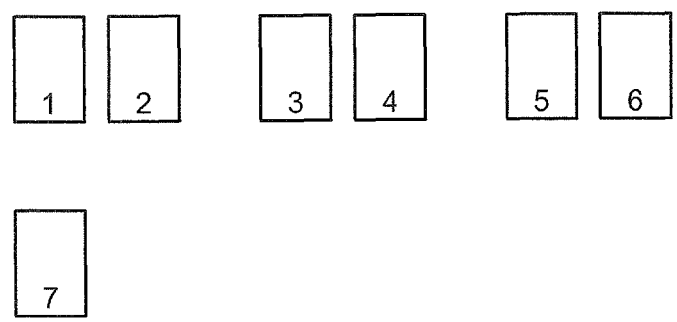
Figure 4C:
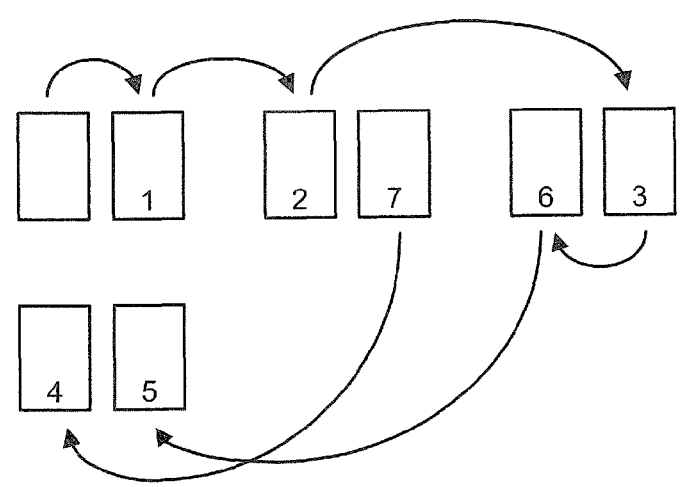

Here, upon accepting instructions of the saddle-stitch bookbinding, as shown in FIG. 4B, the seven sheet images are reduced and aligned two by two with spacing. Thereafter, the seven document images move positions such that pages are aligned when bookbinding is performed. It should be noted that, in this example, since the last page becomes blank when bookbinding is completed, a blank document image is inserted as the first document image.

Figure 4D:
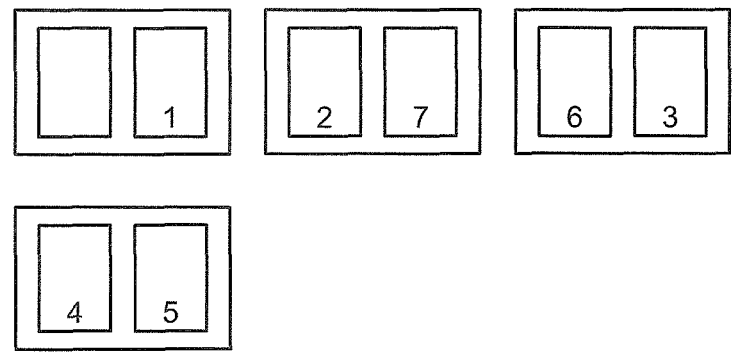

Further, as shown in FIG. 4D, a sheet image appears outside of each pair of aligned document images, to thereby represent that document images of two pages are contained in one sheet.

Figure 4E:
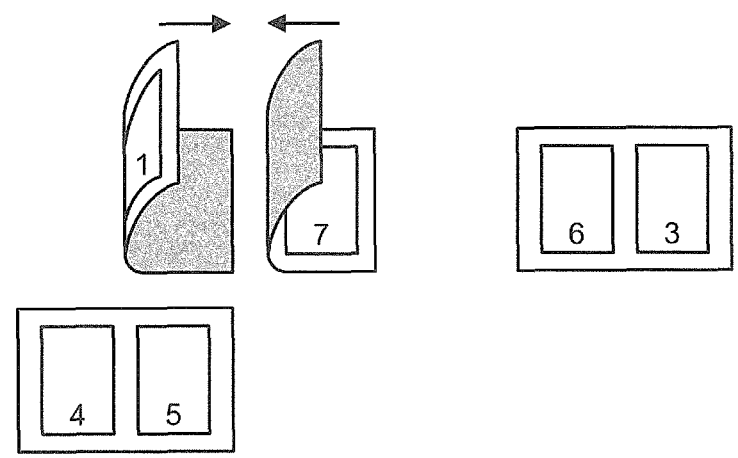

Thereafter, as shown in FIG. 4E, of the four sheet images, the first sheet image and the second sheet image are attracted each other while being folded.

Figure 4F:
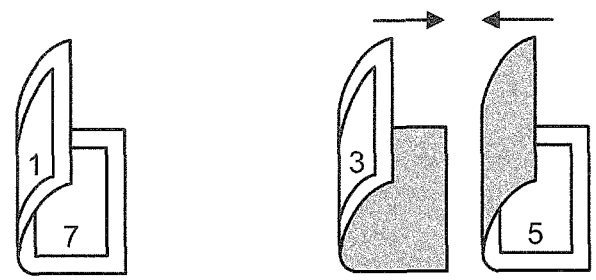

Consequently, as shown in FIG. 4F, the first sheet image and the second sheet image form one sheet image having document images on both sides thereof, and then the third sheet image and the fourth sheet image have the same behavior as the first sheet image and the second sheet image in FIG. 6E to result in two sheet images.

Figure 4G:
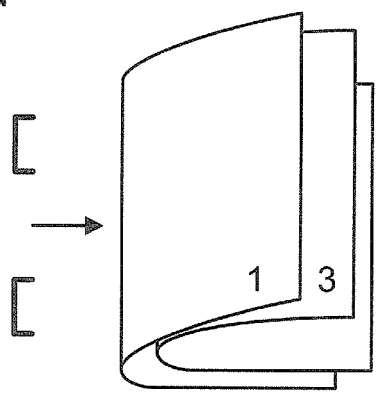

Thereafter, as shown in FIG. 4G, the state of laying the two sheet images and stapling the center thereof is displayed.

Figure 4H:
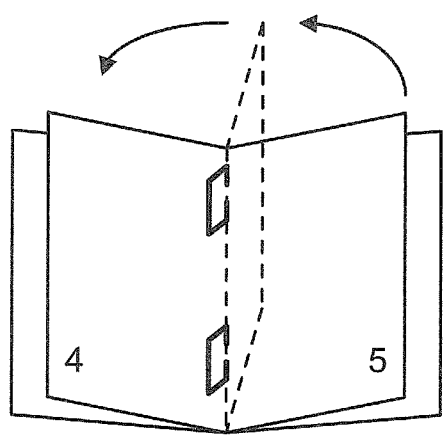

Ultimately, as shown in FIG. 4H, animation display in which pages are turned, though an operation of turning pages one by one is not executed, is performed.

Next, the image processing device 10 that realizes operations as outlined above will be described in detail.

Figure 5:
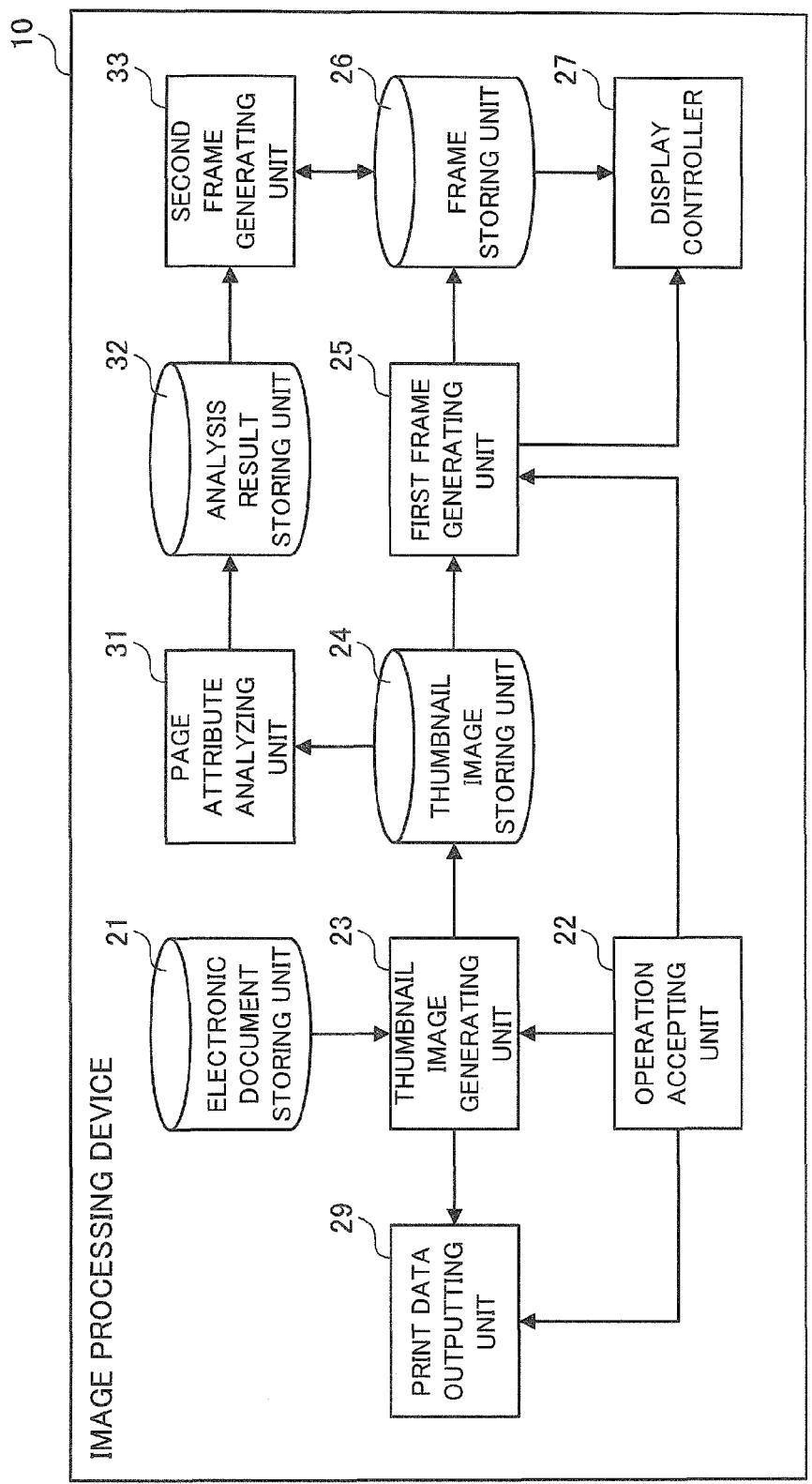
FIG. 5 is a block diagram showing an example of a functional configuration of the image processing device in the exemplary embodiment according to the present invention.

FIG. 5 is a block diagram showing an example of a functional configuration of the image processing device 10.

As shown in the figure, the image processing device 10 includes: an electronic document storing unit 21; an operation accepting unit 22; a thumbnail image generating unit 23; a thumbnail image storing unit 24; a first frame generating unit 25; a frame storing unit 26; a display controller 27 and a print data outputting unit 29. Further, the image processing device 10 includes a page attribute analyzing unit 31; an analysis result storing unit 32 and a second frame generating unit 33.

The electronic document storing unit 21 stores the electronic document to be printed. Here, the electronic document to be printed refers to, for example, an electronic document reconstructed based on PDL (page description language) data transmitted from a not-shown PC (personal computer), a PDF file transmitted from a not-shown PC through a PDF direct printing function, and an electronic document captured from a not-shown server computer or mobile terminal. However, "electronic document" in the present specification is not only limited to "document" including texts and subjected to electronization. For example, it is assumed that graphic data such as graphics, and image data such as paintings and photographs are included in "electronic document" regardless of whether it is raster data or vector data. In the exemplary embodiment, the electronic document is used as an example of data.

When an operation is performed on the operation panel 15 by a user, the operation accepting unit 22 accepts information based on the user's operation. For example, if an operation for designating pages to be printed of the electronic document is performed as the user's operation, the page numbers of the designated pages are accepted. Moreover, if an operation for designating print processing (such as the duplex print or the aggregate print) is performed, designation of the print processing (such as the duplex print or the aggregate print) is accepted. Further, operation of requesting printing of the designated pages is performed, a printing request indicating to make a request for printing is accepted. In the exemplary embodiment, a page is used as an example of a part, a page number is used as an example of part-designation information, designation of the print processing is used as an example of processing-designation information that designates print processing, the printing request is used as an example of printing request information, and the operation accepting unit 22 is provided as an example of an accepting unit that accepts the part-designation information, the processing-designation information and the printing request information.

The thumbnail image generating unit 23 retains pages, of the pages of the electronic document stored in the electronic document storing unit 21, corresponding to the page numbers accepted by the operation accepting unit 22, and generates thumbnail images by reducing those pages. Moreover, when the operation accepting unit 22 accepts the designation of the print processing (such as the duplex print or the aggregate print), the thumbnail image generating unit 23 also retains pages for printing which are generated by performing a layout on the retained pages in accordance with the designation of the processing in printing.

The thumbnail image storing unit 24 stores the thumbnail images generated by the thumbnail image generating unit 23.

By use of the thumbnail images stored in the thumbnail image storing unit 24, the first frame generating unit 25 generates: a frame of an initial image for displaying the initial image; frames for animation display of the processes in print processing; a frame of aligned images for displaying the images aligned after being subjected to the print processing; and a frame of a finished image for displaying the finished image in which the aligned images are stacked to be finished as a finished article. In the exemplary embodiment, the thumbnail image is used as an example of a specific image, the frame of the finished image is used as an example of a stacking image, and the first frame generating unit 25 is provided as an example of a generating unit that generates the stacking image.

The frame storing unit 26 stores the frame for animation display of the processes in print processing, the frame for the aligned images and the frame of the finished image, which have been generated by the first frame generating unit 25, as well as a frame for animation display of the process of page turning added by the second frame generating unit 33, which will be described later.

The display controller 27 exerts control on the frame of the initial image generated by the first frame generating unit 25 to be displayed on the operation panel 15, and thereafter, sequentially takes the frames out of the frame storing unit 26 that stores thereof, and exerts control on these frames to be sequentially displayed on the operation panel 15. In the exemplary embodiment, the display controller 27 is provided as an example of a controller that exerts control to display the processes on the display screen.

The print data outputting unit 29 outputs data for printing the pages for printing retained in the thumbnail image generating unit 23 to the image forming unit 17.

The page attribute analyzing unit 31 analyzes the thumbnail images stored in the thumbnail image storing unit 24 and specifies pages in which an attribute of a page of a sheet or an attribute of an image to be printed on a page of a sheet (hereinafter, these are collectively referred to as "page attribute") is changed. Here, the attribute of a page of a sheet includes a page number, a page size and the like. In the case where the page attribute is a page number, the page attribute analyzing unit 31 specifies, for example, a page whose page number is a median of all pages, and in the case where the page attribute is a page size, the page attribute analyzing unit 31 specifies, for example, a page whose size is changed from A4 size to A3 size to be subjected to Z-folding. Or, though change is not specified by analyzing the thumbnail images, paper quality of the sheet or the like may be included in the attribute of a page of a sheet. Further, the attribute of an image to be printed on a page of a sheet includes color of an image, an arrangement position of an image, an arrangement orientation of an image, a content of an image and the like. In the case where the page attribute is a color of an image, the page attribute analyzing unit 31 specifies, for example, a page in which color of an image changes from monochrome to full color, in the case where the page attribute is an arrangement position of an image, the page attribute analyzing unit 31 specifies, for example, pages in which an image is printed over a double-page spread, in the case where the page attribute is an arrangement orientation of an image, the page attribute analyzing unit 31 specifies, for example, a page in which an orientation of an original is changed, and in the case where the page attribute is a content of an image, the page attribute analyzing unit 31 specifies, for example, a page in which a chapter in a text changes. It should be noted that which page attribute, of these page attributes, to be used may be set in the image processing device 10 in advance, or may be designated by the user when the user designates the print processing. In the exemplary embodiment, the page attribute is used as an example of a predetermined property of at least one of a recording medium and an image recorded on the recording medium.

The analysis result storing unit 32 stores the page number of the page specified by the page attribute analyzing unit 31, in which page attribute changes, in association with information indicating the page attribute. It should be noted that, in the exemplary embodiment, since it is assumed to specify the page in which page attribute changes for each of plural page attributes, the page number is associated with information indicating the page attribute; however, in the case where a page in which a predetermined single page attribute changes is specified, the page number may not be associated with information indicating the page attribute.

The second frame generating unit 33 generates a frame for animation display of the process of page turning in the finished article based on the frame of the finished image stored in the frame storing unit 26.

It should be noted that these functional units are implemented by cooperation of software and hardware resources. Specifically, the CPU 11 reads the programs for implementing the operation accepting unit 22, the thumbnail generating unit 23, the first frame generating unit 25, the display controller 27, the print data outputting unit 29, the page attribute analyzing unit 31 and the second frame generating unit 33 from the HDD 14 into the RAM 12, and executes thereof to thereby implement these functional units. In addition, the electronic document storing unit 21, the thumbnail image storing unit 24, the frame storing unit 26 and the analysis result storing unit 32 are implemented by, for example, the HDD 14.

Next, operations of the image processing device 10 will be described.

Figure 6:
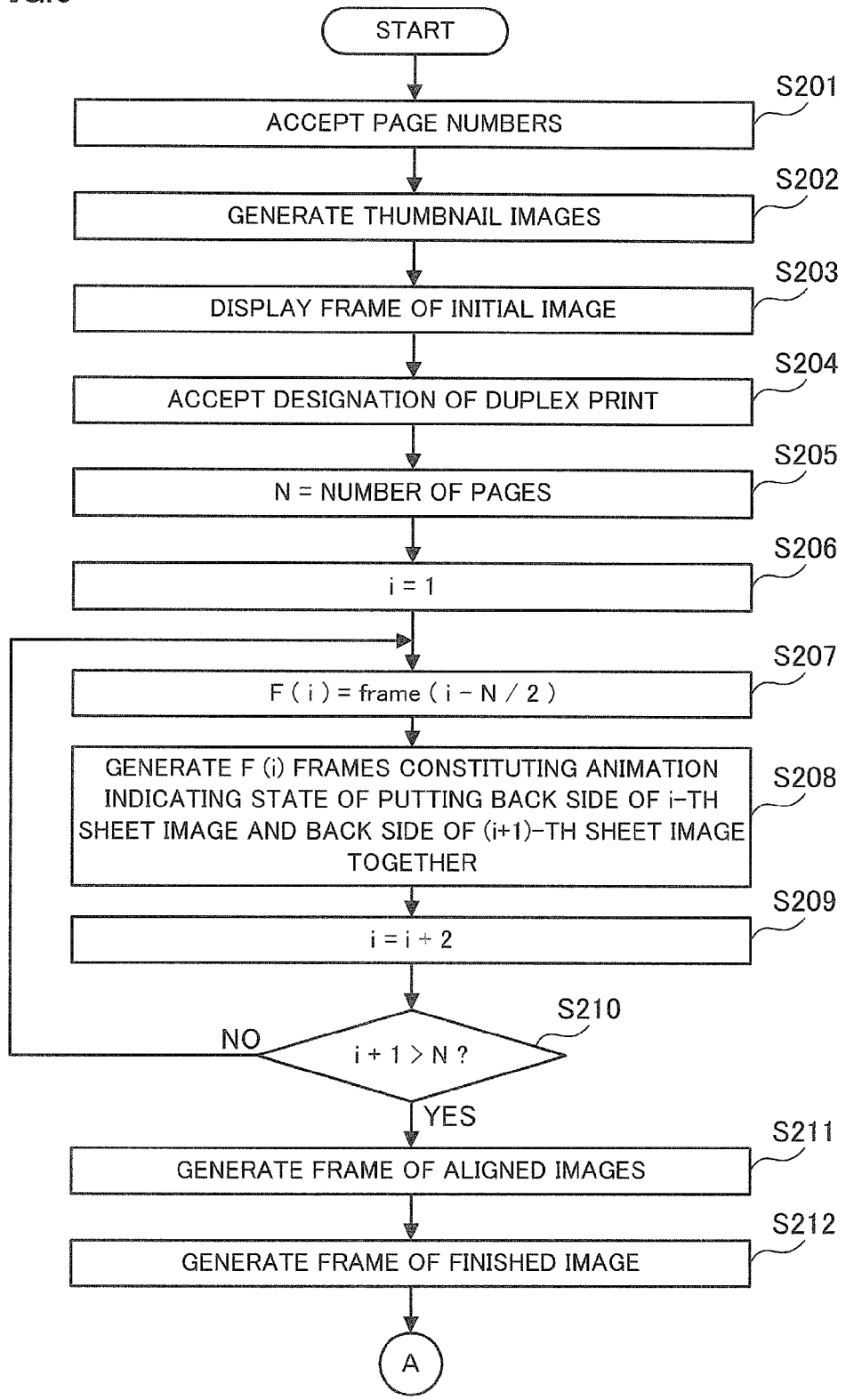
FIGS. 6 and 7 are flowcharts showing an example of operations of the image processing device in the case where the duplex print is designated as print processing.
Figure 7:
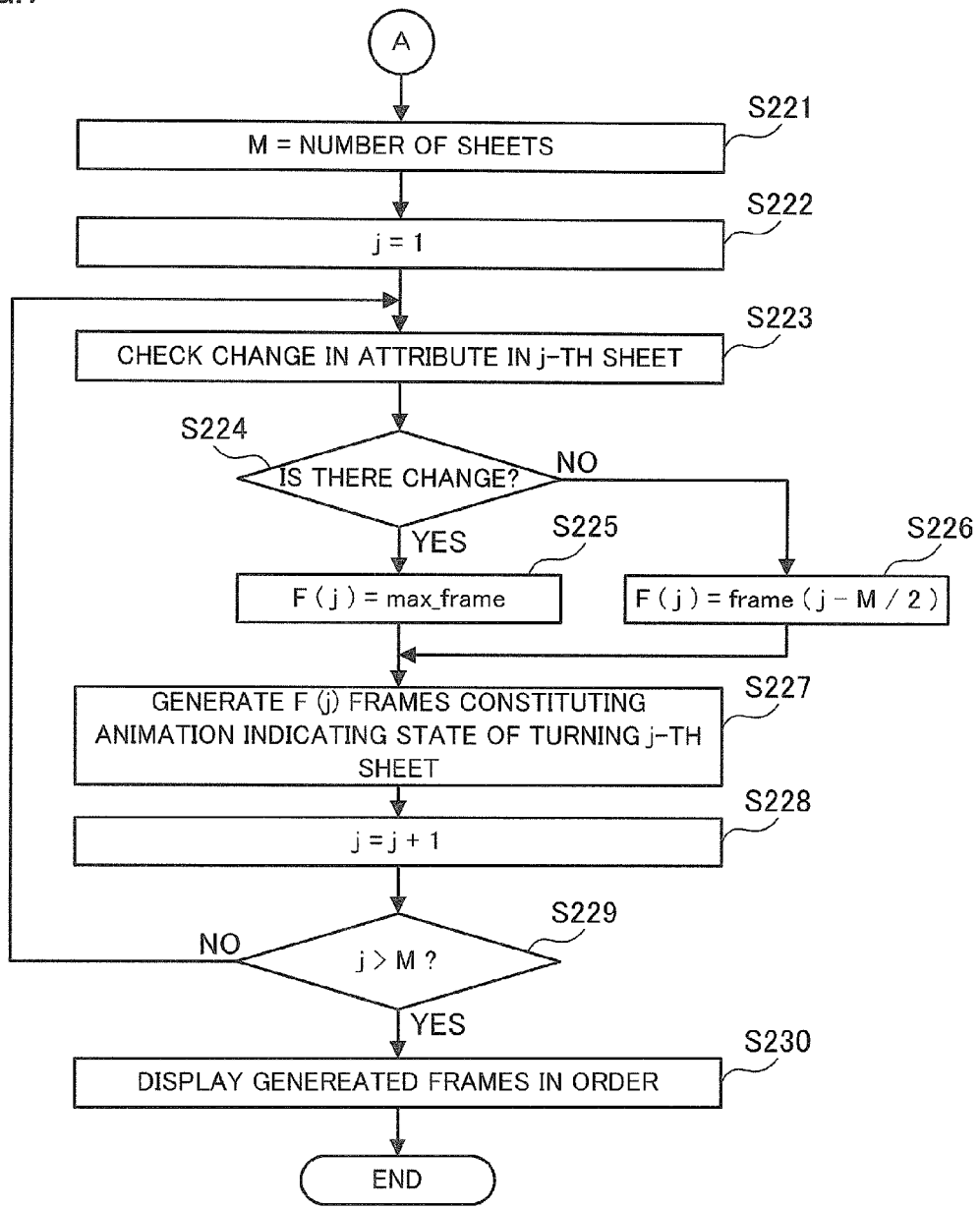

FIGS. 6 and 7 are flowcharts showing an example of operations of the image processing device 10 in the case where the duplex print is designated as the print processing. It should be noted that the example of operations corresponds to the display examples shown in FIGS. 2A to 2G.

The operations of the flowcharts are started by designation of pages to be printed of an electronic document on the operation panel 15 by a user.

When the operations are started, in the image processing device 10, the operation accepting unit 22 accepts the page numbers of the pages to be printed of the electronic document as shown in FIG. 6 (step 201).

Then, the thumbnail image generating unit 23 generates thumbnail images of the pages corresponding to the page numbers accepted in step 201 from among the pages of the electronic document stored in the electronic document storing unit 21 (step 202). It should be noted that, at this time, the thumbnail image generating unit 23 stores a copy of the pages before generation of the thumbnail images in a memory of its own. The thumbnail images having been generated are stored in the thumbnail image storing unit 24.

Next, the first frame generating unit 25 generates a frame of an initial image by use of the thumbnail images stored in the thumbnail image storing unit 24, and the display controller 27 exerts control on the display of this frame, and thereby the frame of the initial image is displayed on the operation panel 15 (step 203). It should be noted that the frame generated here is the frame shown in FIG. 2A in the specific examples of FIGS. 2A to 2G.

When the frame of the initial image is displayed on the operation panel 15, the user checks the display and performs an operation to designate processing such as the duplex print and the aggregate print on the operation panel 15. Here, it is assumed that an operation to designate the processing of the duplex print is performed. Then, in the image processing device 10, the operation accepting unit 22 accepts the designation of the duplex print (step 204).

This causes the first frame generating unit 25 to start processing of generation of a frame for animation display of the processes in the duplex print processing.

When the processing is started, first, the first frame generating unit 25 substitutes the number of the pages to be printed into a variable N (step 205).

Next, the first frame generating unit 25 substitutes 1 into a variable i to count the number of sheet images (step 206), and repeats the process to generate a frame for the variable i while performing addition to the variable i by twos.

Here, the processing to generate a frame for the variable i is as follows.

First, frame (i−N/2) is substituted into a variable F (i) that represents the number of frames with respect to the variable i (step 207). Then, F (i) frames constituting animation, which indicates the state of putting the backside of the i-th sheet image and the backside of the (i+1)-th sheet image together, are generated (step 208). It should be noted that the frames generated here are: the frames shown in FIG. 2B when the variable i is 1; the frames shown in FIG. 2C when the variable i is 3; and the frames shown in FIG. 2D when the variable i is 5, among the specific examples shown in FIGS. 2A to 2G. In FIGS. 2B to 2D, only one state is shown with respect to a single value of the variable i; however, actually, frames corresponding to several states with respect to the single value of the variable i are generated. For example, when the variable i is 1, frames corresponding to the states of plural time points, which start from a time point where the first sheet image and the second sheet image begin to approach to a time point where the sheet images are completely put together, are generated.

In this manner, several frames are generated with respect to the variable i, and the number thereof is provided as F (i) as described above. If it is assumed that a speed of putting the sheet images together is the same for all the values of the variable i, F (i) may be a fixed value irrespective of the value of the variable i; however, in the exemplary embodiment, F (i) is set as a function value of frame (i−N/2) with a degree of separation from the center page as a parameter to make a difference in the speed of putting the sheet images together between the both end portions and the center portion. Here, if the purpose is to simply make a difference in the speed of putting the sheet images together between the both end portions and the center portion, frame (x) may be any function except for a function having a fixed value. On the other hand, in the case where the purpose is to respond to a request of carefully observing the state of putting the sheet images together in the both end portions, though there is no need to carefully observe the state of putting the sheet images together in the intermediate portion, frame (x) may be a monotonically non-decreasing function where frame $(x_1)$≤frame $(x_2)$ holds for $x_1 < x_2$. For example, setting frame (x) to be a monotonically non-decreasing function includes that the number of frames with respect to the variable i is provided as F1 for some percentage of the sheet images in the both end portions, while the number of frames with respect to the variable i is provided as F2, which is extremely smaller than F1, for the sheet images sandwiched between the sheet images in both end portions.

It should be noted that the frames generated here are stored in the frame storing unit 26. On that occasion, it is assumed that several frames generated with respect to the variable i are stored in the order of time when the states represented by the frames occur.

Thereafter, the first frame generating unit 25 adds 2 to the variable i (step 209), and determines whether or not the value obtained by adding 1 to the variable i becomes larger than the value of the variable N (step 210). As a result, if it is determined that the value obtained by adding 1 to the variable i is not larger than the value of the variable N, the process returns to step 207. On the other hand, if it is determined that the value obtained by adding 1 to the variable i is larger than the value of the variable N, the process proceeds to step 211.

To be described in more detail, in the case where the value of the variable N is an odd number, the processes of steps 207 to 209 are performed up to i=N−2; however, when it comes to i=N, the process proceeds to step 211. Further, in the case where the value of the variable N is an even number, the processes of steps 207 to 209 are performed up to i=N−1; however, when it comes to i=N+1, the process proceeds to step 211. For example, since N=7 in FIGS. 2A to 2G, the processes of steps 207 to 209 are performed up to the fifth sheet image and the sixth sheet image; however, when it comes to the seventh sheet image, the process proceeds to step 211 without performing the processes of steps 207 to 209.

Then, the first frame generating unit 25 generates a frame for aligned images in which sheet images obtained by putting two sheet images together in step 208 are aligned (step 211). However, if the value of the variable N is an odd number, the last sheet image is included in the frame of aligned images as it is. It should be noted that the frame generated here is the frame shown in FIG. 2E in the specific examples of FIGS. 2A to 2G. Further, the generated frame is stored in the frame storing unit 26.

Thereafter, the first frame generating unit 25 generates a frame of a finished image in which sheet images aligned in step 211 are bundled (step 212). It should be noted that the frame generated here is the frame shown in FIG. 2F in the specific examples of FIGS. 2A to 2G. Further, the generated frame is stored in the frame storing unit 26.

This causes the second frame generating unit 33 to start processing of generation of a frame for animation display of the processes of turning pages in the finished article represented by the finished image. It should be noted that, prior to the processing, it is assumed that the page attribute analyzing unit 31 analyzes the page attribute of the sheets, and thereby the page number of a page in which the page attribute is changed is stored in the analysis result storing unit 32.

When the processing is started, first, as shown in FIG. 7, the second frame generating unit 33 substitutes the number of sheets in the finished article into a variable M (step 221). It should be noted that the number of sheets in the finished article may be calculated based on the number of pages retained by the variable N and the designation of print processing accepted in step 204 in FIG. 6.

Next, the second frame generating unit 33 substitutes 1 into a variable j to count the number of sheets (step 222), and repeats the process to generate a frame for the variable j while performing addition to the variable i by one.

Here, the processing to generate a frame for the variable j is as follows.

First, of the page numbers stored in the analysis result storing unit 32, a check is made on the change in the page attribute in the j-th sheet with reference to the page numbers associated with the designated page attribute (step 223). Specifically, the check may be made whether or not the pages of the page numbers associated with the designated page attribute are included in the j-th sheet. Then, it is determined whether there is a change in the page attribute in the j-th sheet or not (step 224).

As a result, if it is determined that there is a change in the page attribute in the j-th sheet, max_frame is substituted into a variable F (j) that represents the number of frames for the variable j (step 225).

On the other hand, if it is determined that there is no change in the page attribute in the j-th sheet, frame (j−M/2) is substituted into the variable F (j) that represents the number of frames for the variable j (step 226).

Thereafter, F (j) frames constituting animation, which indicates the state of turning the j-th sheet, are generated (step 227). It should be noted that the frames generated here are, among the specific examples shown in FIGS. 2A to 2G, the frame shown in FIG. 2G when the variable j is 4. In FIG. 2G, only one state is shown with respect to a single value of the variable j; however, actually, frames corresponding to several states with respect to the single value of the variable j are generated. For example, when the variable j is 4, other than the frame indicating the state shown in FIG. 2G, frames corresponding to the states of plural time points, which start from a time point where the third sheet is finished to be turned to a time point where the fourth sheet is finished to be turned, are generated.

In this manner, several frames are generated with respect to the variable j, and the number thereof is provided as F (j) as described above. If it is assumed that a speed of turning pages is the same for all the values of the variable j, F (j) may be a fixed value irrespective of the value of the variable j; however, in the exemplary embodiment, as to the sheet in which no change in the page attribute exists, F (j) is set as a function value of frame (j−M/2) with a degree of separation from the center sheet as a parameter to make a difference in the speed of turning pages between the both end portions and the center portion. Here, if the purpose is to simply make a difference in the speed of turning pages between the both end portions and the center portion, frame (x) may be any function except for a function having a fixed value. On the other hand, in the case where the purpose is to respond to a request of carefully observing the state of turning pages in the both end portions, though there is no need to carefully observe the state of turning pages in the center portion, frame (x) may be a monotonically non-decreasing function where frame $(x_1)$≤frame $(x_2)$ holds for $x_1<x_2$. For example, setting frame (x) to be a monotonically non-decreasing function includes that the number of frames with respect to the variable j is provided as F1 for some percentage of the sheets in the both end portions, while the number of frames with respect to the variable j is provided as F2, which is extremely smaller than F1, for the sheets sandwiched between the sheets in both end portions.

On the other hand, as to the sheet in which a change in the page attribute exists, F (j) is set to max_frame. Here, max_frame is a predetermined number of frames for showing a state of slowly turning the j-th sheet. For example, a maximum value of the frame (j−M/2) may be max_frame. Or, even in the sheet in which a change in the page attribute exists, in the case where the speed of turning pages may not be as fast as that in the sheets in both end portions, for example, the maximum value of frame (j−M/2) with respect to j in a range from a value larger than 1 as a lower limit to a value smaller than M as an upper limit may be max_frame. Consequently, for example, in the case where the page attribute is assumed to be the page number and a center sheet is specified as the sheet in which a change in the page attribute exists, even though the sheets in the intermediate portion are turned fast, only the center sheet is turned slowly to thereby draw user's attention to the fact that turning pages has come to the halfway point, or thoroughly show a double-page spread, which is often provided at the center sheets.

It should be noted that the frames generated here are stored in the frame storing unit 26. On that occasion, it is assumed that several frames generated with respect to the variable j are stored in the order of time when the states represented by the frames occur.

Thereafter, the second frame generating unit 33 adds 1 to the variable j (step 228), and determines whether or not the value of the variable j becomes larger than the value of the variable M (step 229). As a result, if it is determined that the value of the variable j is not larger than the value of the variable M, the process returns to step 223. On the other hand, if it is determined that the value of the variable j is larger than the value of the variable M, the process proceeds to step 230.

When various kinds of frames are stored in the frame storing unit 26 in this way, the display controller 27 reads the frames from the frame storing unit 26 in the order of being stored, and exerts control on the display of these frames, and thereby the processes in the duplex print processing and the processes of turning pages are displayed on the operation panel 15 (step 230). On that occasion, the display controller 27 sets the same time for displaying each frame, to thereby slow the operation in a page where many frames are generated, while accelerate the operation in a page where generated frames are small in number.

It should be noted that, at this time, the thumbnail image generating unit 23 performs layout conversion based on the designation of the duplex print accepted in step 204 on the copy of the pages stored in the memory of its own.

When the processes of the duplex print processing and the processes of turning pages are displayed on the operation panel 15 in this manner, the user checks the display and performs an operation to make a request for the duplex print of the designated pages on the operation panel 15. Then, in the image processing device 10, the operation accepting unit 22 accepts the request for printing, and the print data outputting unit 29 outputs the print data, which is based on the pages subjected to the layout conversion and stored in the memory of the thumbnail image generating unit 23, to the image forming unit 17.

It should be noted that, in this operation example, the same function, which is frame (x), is used in both step 207 in FIG. 6 and step 226 in FIG. 7; however, different functions may be used in step 207 in FIG. 6 and step 226 in FIG. 7.

Moreover, in this operation example, in steps 224 to 226 in FIG. 7, the number of frames is configured to differ depending on whether there is a change in the page attribute or not; however, display modes or the like may be configured to differ. As a specific example of configuring the display modes to differ, it is conceivable that a sheet is highlighted when there occurs a change in the page attribute, and a sheet is not highlighted when there is no change in the page attribute.

Further, in this operation example, the number of frames with respect to the variable i is determined in step 207 in FIG. 6 and the frames of the determined number are formed in step 208 in FIG. 6 for controlling the speed of animation display of the processes in the duplex print processing; however, the operation is not limited thereto. For example, it may be allowed to determine the display time per one frame with respect to the variable i in step 207 in FIG. 6, generate the same number of frames irrespective of the variable i in step 208 in FIG. 6 and store the frames to be associated with the determined display time, and thereby to display each frame for the display time associated therewith in step 230 in FIG. 7. Moreover, with more generalization, a method may be employed such that the speed of the animation display per each value of the variable i becomes the speed responding to the value of the variable i.

Still further, in this operation example, the number of frames with respect to the variable j is determined in step 226 in FIG. 7 and the frames of the determined number are formed in step 227 in FIG. 7 for controlling the speed of animation display of the processes of turning pages; however, the operation is not limited thereto. For example, it may be allowed to determine the display time per one frame with respect to the variable j in step 226 in FIG. 7, generate the same number of frames irrespective of the variable j in step 227 in FIG. 7 and store the frames to be associated with the determined display time, and thereby to display each frame for the display time associated therewith in step 230 in FIG. 7. Moreover, with more generalization, a method may be employed such that the speed of the animation display per each value of the variable j becomes the speed responding to the value of the variable j. Here, the value of the variable j is an example of the order of selecting the specific image.

Incidentally, in the exemplary embodiment, the operation example to achieve the display example in FIGS. 2A to 2G is shown by the flowcharts in FIGS. 6 and 7, while operation examples to achieve the display examples in FIGS. 3A to 3F and FIGS. 4A to 4H are not explicitly shown. However, parts related to turning pages in the display examples in these figures are shown by the flowcharts in FIGS. 6 and 7.

In other words, an operation example to achieve the display example in FIGS. 3C to 3F, of the display example in FIGS. 3A to 3F, is shown by the flowcharts in FIGS. 6 and 7. However, in this case, it is assumed that the number of sheets is substituted into the variable N.

In addition, an operation example to achieve the display example in FIGS. 4E to 4H, of the display example in FIGS. 4A to 4H, is shown by the flowcharts in FIGS. 6 and 7. However, also in this case, it is assumed that the number of sheets is substituted into the variable N.

Moreover, in the exemplary embodiment, display of the processes of turning pages, namely, display of turning pages without requiring user's operation is set to a default; however, whether to perform such display of turning pages or to perform display of turning pages requiring the user's operation may be selected by the user.

Further, in the exemplary embodiment, no description is given to halting of operation of turning pages during the display of the process of turning pages; however, a pause (temporary stop) of turning pages may be carried out during the display of the process of turning pages in response to user's operation.

Still further, in the exemplary embodiment, in the case where a check is wanted while focusing on some points, such that page numbers, annotations or punched holes do not overlap the text, the process of turning pages may be displayed with the points to be focused being enlarged.

Moreover, in the exemplary embodiment, the process of turning pages is displayed in the case where the duplex print is designated; however, in the case where the duplex print is not designated, for example, in the case where only the aggregate print is designated, the process of turning pages may be displayed.

Further, in the exemplary embodiment, the description has been given on the assumption that the operation to perform animation display of the processes in print processing and the process of turning pages is executed by the image processing device 10; however, the operation may be executed by any device.

Accordingly, on an assumption that such operation is executed by a computer 90, a hardware configuration of the computer 90 will be described.

Figure 8:
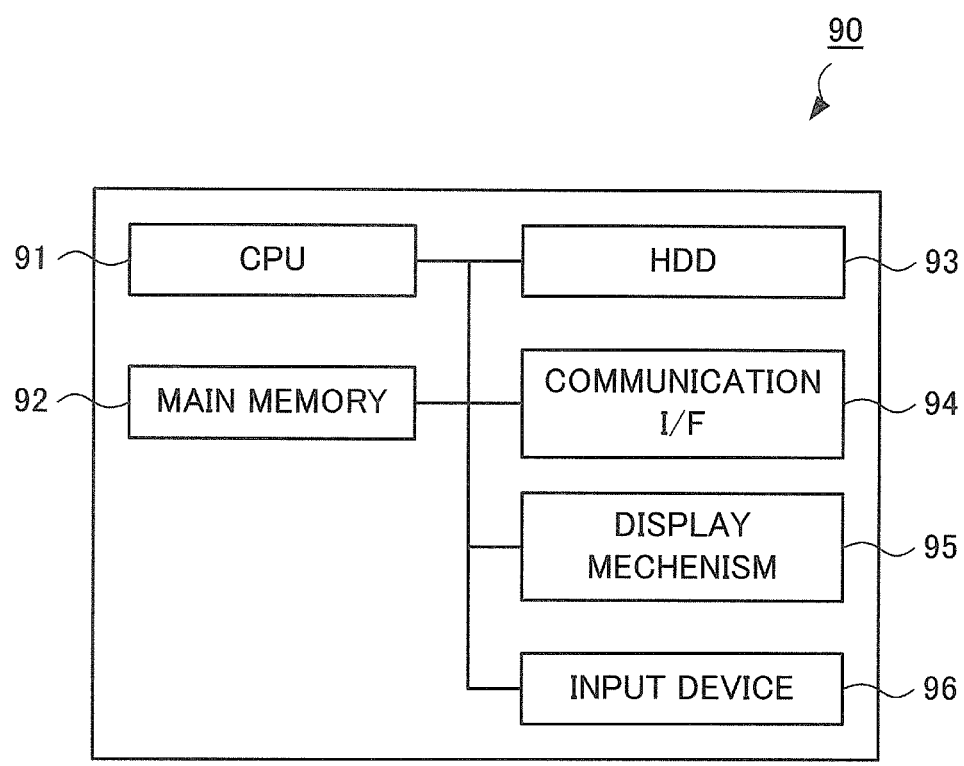
FIG. 8 is a diagram showing an example of a hardware configuration of a terminal device to which the exemplary embodiment according to the present invention is applied.

FIG. 8 is a diagram showing a hardware configuration of the computer 90.

As shown in FIG. 8, the computer 90 includes a central processing unit (CPU) 91 as an arithmetic unit, a main memory 92 as a storing unit and a magnetic disk device (HDD: Hard Disk Drive) 93. Here, the CPU 91 executes an operating system (OS) and various kinds of software such as application, and achieves various processing units as described above. The main memory 92 stores various kinds of software, data used for executing the software and the like, while the magnetic disk device 93 stores input data to various kinds of software, output data from various kinds of software and the like, and at least one of the main memory 92 and the magnetic disk device 93 achieves above-described each storing unit.

Furthermore, the computer 90 includes a communication I/F 94 that performs communication with external devices, a display mechanism 95 including a video memory, a display and the like, and an input device 96 such as a keyboard and a mouse.

The program that achieves the exemplary embodiment may be provided not only by a communication unit but also by being stored in a recording medium such as a CD-ROM.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display control device comprising:
   an obtainer that obtains a stacking image formed by stacking a plurality of specific images for specifying respective contents of images recorded on at least one surface of each of a plurality of recording media; and
   a controller that exerts control so that a page turning process is displayed on a display screen, the page turning process sequentially performing an operation to select one specific image from the plurality of specific images in the stacking image obtained by the obtainer and to change the one specific image to represent a state in which at least a part of a recording medium corresponding to the one specific image is turned, to thereby show at least a part of another specific image hidden behind the one specific image while changing one specific image to be selected,
   wherein the controller exerts control so that, in the same page turning process for showing an animation of sequentially turning all of the plurality of specific images, a page turning for the one specific image is performed faster or slower than a page turning for a previous specific image among the plurality of specific images, according to a placement of the one specific image within an order of the plurality of specific images,
   wherein the controller exerts the control so that a process of a duplex print processing is displayed on the display screen, and
   wherein the page turning for the one specific image corresponds to a page turning of a single sheet of the plurality of recording media, and the page turning for the previous specific image corresponds to a page turning of a previous single sheet of the plurality of recording media,
   wherein the controller exerts control so that, in the same page turning process for showing the animation of sequentially turning all of the plurality of specific images, a page turning for the one specific image is performed with a first speed in a case where the one specific image is positioned after a first position and before a second position within the order of the plurality of specific images, and performed with a speed slower than the first speed in a case where the one specific image is positioned before the first position, or in a case where the one specific image is positioned after the second position.

2. The display control device according to claim 1, wherein the controller exerts control so that the page turning process is performed with a speed equal to or slower than a speed in a previous operation in the page turning process in a case where there is a change in a predetermined property of at least one of the recording medium and an image recorded on the recording medium.

3. The display control device according to claim 1, wherein the controller is configured to exert control so that an animation of combining sheet images onto opposing surfaces of a single sheet for a duplex print processing is displayed on the display screen.

4. The display control device according to claim 1, wherein the controller is configured to exert control so that the process of the duplex print processing based on print data received from an external device is displayed on the display screen.

5. A display device comprising:
- an image display that displays a stacking image formed by stacking a plurality of specific images for specifying respective contents of images recorded on at least one surface of each of a plurality of recording media; and
- a process display that displays a page turning process sequentially performing an operation to select one specific image from the plurality of specific images in the stacking image and to change the one specific image to represent a state in which at least a part of a recording medium corresponding to the one specific image is turned, to thereby show at least a part of another specific image hidden behind the one specific image while changing one specific image to be selected,
- wherein the process display performs the page turning process so that, in the same page turning process for showing an animation of sequentially turning all of the plurality of specific images, a page turning for the one specific image is performed faster or slower than a page turning for a previous specific image among the plurality of specific images, according to a placement of the one specific image within an order of the plurality of specific images,
- wherein the process display displays a process of a duplex print processing, and
- wherein the page turning for the one specific image corresponds to a page turning of a single sheet of the plurality of recording media, and the page turning for the previous specific image corresponds to a page turning of a previous single sheet of the plurality of recording media,
- wherein, in the same page turning process for showing the animation of sequentially turning all of the plurality of specific images, a page turning for the one specific image is performed with a first speed in a case where the one specific image is positioned after a first position and before a second position within the order of the plurality of specific images, and performed with a speed slower than the first speed in a case where the one specific image is positioned before the first position, or in a case where the one specific image is positioned after the second position.

6. A printing apparatus comprising:
- an acceptor that accepts part-designation information for designating a plurality of parts to be printed included in data, processing-designation information for designating print processing that prints every K parts of the plurality of parts on at least one surface of a recording medium, where K is a natural number, and printing request information for making a request to print the plurality of parts;
- a generator that, when the acceptor accepts the processing-designation information, generates a stacking image formed by stacking a plurality of specific images for specifying respective recorded contents in a plurality of recording media on which the plurality of parts designated by the part-designation information accepted by the acceptor is recorded;
- a display that displays a page turning process for sequentially performing an operation to select one specific image from the plurality of specific images in the stacking image generated by the generator and to change the one specific image to represent a state in which at least a part of a recording medium corresponding to the one specific image is turned, to thereby show at least a part of another specific image hidden behind the one specific image while changing one specific image to be selected; and
- a printer that, when the acceptor accepts the printing request information after the page turning process is displayed by the display, prints the plurality of parts in a state where the print processing has been performed,
- wherein, in the same page turning process for showing an animation of sequentially turning all of the plurality of specific images, a page turning for the one specific image is performed faster or slower than a page turning for a previous specific image among the plurality of specific images, according to a placement of the one specific image within an order of the plurality of specific images,
- wherein the display displays a process of a duplex print processing, and
- wherein the page turning for the one specific image corresponds to a page turning of a single sheet of the plurality of recording media, and the page turning for the previous specific image corresponds to a page turning of a previous single sheet of the plurality of recording media,
- wherein, in the same page turning process for showing the animation of sequentially turning all of the plurality of specific images, a page turning for the one specific image is performed with a first speed in a case where the one specific image is positioned after a first position and before a second position within the order of the plurality of specific images, and performed with a speed slower than the first speed in a case where the one specific image is positioned before the first position, or in a case where the one specific image is positioned after the second position.

7. A display control method comprising:
- obtaining a stacking image formed by stacking a plurality of specific images for specifying respective contents of images recorded on at least one surface of each of a plurality of recording media; and
- controlling so that a page turning process is displayed on a display screen, the page turning process sequentially performing an operation to select one specific image from the plurality of specific images in the stacking image and to change the one specific image to represent a state in which at least a part of a recording medium corresponding to the one specific image is turned, to thereby show at least a part of another specific image hidden behind the one specific image while changing one specific image to be selected,
- wherein the controlling controls so that, in the same page turning process for showing an animation of sequentially turning all of the plurality of specific images, a page turning for the one specific image is performed faster or slower than a page turning for a previous specific image among the plurality of specific images, according to a placement of the one specific image within an order of the plurality of specific images, wherein the controlling controls so that a process of duplex print processing is displayed on the display screen, and wherein the page turning for the one specific image corresponds to a page turning of a single sheet of the plurality of recording media, and the page turning for the previous specific image corresponds to a page turning of a previous single sheet of the plurality of recording media, wherein, in the same page turning process for showing the animation of sequentially turning all of the plurality of specific images, a page turning for the one specific image is performed with a first speed in a case where the one specific image is positioned after a first position and before a second position within the order of the plurality of specific images, and performed with a speed slower than the first speed in a case where the one specific image is positioned before the first position, or in a case where the one specific image is positioned after the second position.

8. A non-transitory computer readable medium storing a program that causes a computer to execute a process for display controlling, the process comprising:

obtaining a stacking image formed by stacking a plurality of specific images for specifying respective contents of images recorded on at least one surface of each of a plurality of recording media; and controlling so that a page turning process is displayed on a display screen, the page turning process sequentially performing an operation to select one specific image from the plurality of specific images in the stacking image and to change the one specific image to represent a state in which at least a part of a recording medium corresponding to the one specific image is turned, to thereby show at least a part of another specific image hidden behind the one specific image while changing one specific image to be selected, wherein the controlling controls so that, in the same page turning process for showing an animation of sequentially turning all of the plurality of specific images, a page turning for the one specific image is performed faster or slower than a page turning for a previous specific image among the plurality of specific images, according to a placement of the one specific image within an order of the plurality of specific images, wherein the controlling controls so that a process of duplex print processing is displayed on the display screen, and wherein the page turning for the one specific image corresponds to a page turning of a single sheet of the plurality of recording media, and the page turning for the previous specific image corresponds to a page turning of a previous single sheet of the plurality of recording media, wherein, in the same page turning process for showing the animation of sequentially turning all of the plurality of specific images, a page turning for the one specific image is performed with a first speed in a case where the one specific image is positioned after a first position and before a second position within the order of the plurality of specific images, and performed with a speed slower than the first speed in a case where the one specific image is positioned before the first position, or in a case where the one specific image is positioned after the second position.

* * * * *